(12) United States Patent
Ashwood Smith et al.

(10) Patent No.: US 7,042,912 B2
(45) Date of Patent: May 9, 2006

(54) RESYNCHRONIZATION OF CONTROL AND DATA PATH STATE FOR NETWORKS

(75) Inventors: Peter J. Ashwood Smith, Hull (CA); Paul P. Beaubien, Ottawa (CA); Darek R. Skalecki, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1030 days.

(21) Appl. No.: 10/017,509

(22) Filed: Dec. 18, 2001

(65) Prior Publication Data

US 2003/0112826 A1    Jun. 19, 2003

(51) Int. Cl.
H04J 3/06    (2006.01)

(52) U.S. Cl. ...................................... 370/503
(58) Field of Classification Search ................ 370/503, 370/401, 465, 389, 442, 347, 351, 352, 216, 370/217, 218, 219, 220, 225, 227, 228, 241, 370/244, 250, 252, 254; 709/228
See application file for complete search history.

(56) References Cited

U.S. PATENT DOCUMENTS

2005/0198312 A1*  9/2005  Ashwwod-Smith et al.  709/228

FOREIGN PATENT DOCUMENTS

| EP | 1 134 922 A | 9/2001 |
|---|---|---|
| WO | WO02/071690 A | 9/2002 |

OTHER PUBLICATIONS

Ko, et al. "A local map based (LMB) self-healing scheme for arbitrary topology networks." Global Telecommunications Conference, 1997. Globecom '97, IEEE Phoenix, AZ, USA, Nov. 3-8 1997, Pp. 1393-1397.

Veitch, et al. "Restoration strategies for future networks." Electronics and Communication Engineering Journal, Institutions of Electrical Engineers, London, GB. vol. 7, No. 3, Jun. 1, 1995, Pp. 97-103.

* cited by examiner

Primary Examiner—Dang Ton
(74) Attorney, Agent, or Firm—Blake Cassels & Graydon LLP; John R.S. Orange (57) ABSTRACT

In a switching protection system, a protocol is followed by a first connection controller to help facilitate the resynchronization of the network after the failure has occurred. This protocol contains the messaging system of the ability to query and store the exact sequence of logical ports and time slots that make up the data path, as a resynchronization table coupled to the first controller. The head/ingress end of the path can receive this information during set-up and can store it both locally and in shadow locations. The system also contains the ability to distinguish between signaling and data channel failures, as signaling channel failures to do not clear cross connect data but simply leave it "ownerless". The system also contains the ability to populate the exact sequence of logical ports and time slots accumulated in the definition of the network, as the set-up message initiated by the head controller to re-claim "ownerless" cross connections contained on respective network elements. The system also facilitates the clearing of a "ownerless" cross connection after a pre-determined period of time has lapsed.

30 Claims, 7 Drawing Sheets

RESYNCHRONIZATION OF CONTROL AND DATA PATH STATE FOR NETWORKS

BACKGROUND OF THE INVENTION

1. Field of the Invention

The present invention relates to switching mechanisms for networks, and in particular to reconnection of network channels.

2. Description of the Prior Art

Global networks are common to all of todays telecommunication and other network systems, wherein various data, optical, and wireless devices are interconnected by a series of individual local networks. The networks generally consist of nodes and links, which describe the network topology, and associated attributes which comprise the network data. Furthermore, these networks further contain management systems that must co-ordinate the transmission of data traffic, including voice, video, and data, and other information over a variety of transmission mediums, such as wireless, copper, and fiber optic lines.

Many of todays telecommunication networks are in nearly continuous use and can ill afford instances of "down" or "off-line" time in the event of network element failure or maintenance and update procedures. Furthermore, telecommunication networks increasingly require control software and hardware that should have little or no scheduled down time. However, these same network systems require cost effective computing solutions, open architecture for supporting a variety of hardware and software formats, and the flexibility to implement the latest software and hardware updates as they become available. Accordingly, it is critical in todays telecommunication networks to provide and maintain the integrity of data communication in the event of disruption in the control and data flows, due to both anticipated and unanticipated interruptions.

Modern telecommunication networks and their support systems have evolved from static installations to dynamic systems, which need to implement and adapt to changes on a regular basis. These dynamic systems increasingly contain new collections of products that process a plurality of requests from a constantly changing user base, in an expected reliable environment. The ability of telecommunication networks to provide stable service availability in this dynamic environment is becoming increasingly important, as the innovation in products and customer environments is expected to increase.

In traditional networks, control flow and data flow were coupled for communication traffic between various network elements. Accordingly, it was typical that both the data and control flows failed at the same time during network interruptions. However, todays telecommunication networks are characterized by the separation of the control and data flows, as the data channels and their operation are somewhat independent from the control channels and their associated software controllers. For example, in optical switches, the lasers and other optical elements can continue to transmit data even in the event that their corresponding optical connection controller experiences either line or module failure. Therefore, during failure events the data channels and control channels can become unsynchronized, such that rather than both being maintained in "up states" their states may alternate between unsynchronized up and down modes of operation. These mismatched operational states of the network for the data and control channels need to be resynchronized in a straightforward and efficient manner, so that the perception of network interruptions by the customer is minimized. Accordingly, during recovery or replacement of network elements the network is expected to resynchronize its state such that the new signaling element knows about the data elements that were previously allocated.

One traditional method of re-synchronization is the journaling technique. Accordingly, at each network element the journaling technique continuously journals (copies) the pertinent state information from the signaling element, such as control instructions and corresponding switch settings, on to spare hardware such as standby signaling elements or to a data element. Therefore, in the event of a network failure the new controller, software and/or hardware, can recover its state by accessing the journal by querying the data element, or if kept in sync by simply restarting. However, this resynchronization method requires dedicated spare hardware for backup storage purposes. Furthermore, the operational speed for such journalling systems is slower as the state information must be stored as it is created and/or changed in the network, and correspondingly these journal copies must be deleted when these network connections are removed. A further disadvantage of the journaling technique is in the deployment of new or enhanced hardware/software, which should be compatible with the old versions on the backup hardware. Further, these new deployments or enhancements must also be journaled, as well as any changes to the copying/journaling protocols resulting from related control protocol modification. Accordingly, implementation of software and hardware updates over the network can be time consuming and problematic, when relying on the journaling technique for network reliability.

It is an object of the present invention to provide a resynchronization method and system to obviate or mitigate some of the above-presented disadvantages.

SUMMARY OF THE INVENTION

The present invention employs a network switching protection system for creating and removing network connections, to recreate connection states after a failure has occurred in network paths between interconnected network elements. The network paths are traditionally organized in control layers and in line layers of the network. The switching system can store the connection state of the entire paths of the network in a resynchronization table coupled to the head end controller of the network, in a localized or distributed fashion. After a control element failure, network signaling mechanisms are used to repopulate the connection states from a localized location, such as a controller at the connection head end, and are used to recreate the failed paths and carry the corresponding connection state information back to all of the control elements along these paths. Furthermore, when there is a failure in the control network paths but the corresponding data network paths continue to operate, the head end controller receives an indication that there has been a control path failure as distinguished from a data path failure. Accordingly, after the data path failure is detected, each of the controllers concerned query the exact connection states of all of their connections in their corresponding network elements and attempt to re-create them, using the actual data path gathered from their stored data path connection states located in the resynchronization table. The present protection switching system can be used in the event of multiple controller failure when the controllers are subsequently re-booted. In this case, the network will continue to carry the data traffic along the active data path. When the controllers are re-started, the controllers re-learn all of their connection states through a set-up message populated by the accumulated connection state data contained in the resynchronization table. This set-up message provides the associated controllers with the connection state information used to continue managing the line layer paths that are already operating on their respective cross connects, and to be able to manage new connections as required. The protection switching system also provides for re-booting in the event of failures for network paths in the line layer, which occurred while portions of the control layer were down. Accordingly, resynchronization in this double failure environment is facilitated through the use of the message populated by the connection state data stored in the resynchronization table, which is accessible and communicated by the head controller along the corresponding network paths.

According to the present invention there is provided a network protection switching system for resynchronizing network communication between a line layer and a control layer after identification of a network failure. The system comprises: a resynchronization table for storing a plurality of connection states corresponding to a plurality of interconnected network elements, the interconnected network elements forming a network path in the line layer of the network. The system also comprises an interface for providing access of a first controller to the connection states of the resynchronization table, the first controller included in the control layer which is coupled to the line layer for monitoring network traffic communicated therein, wherein resynchronization of the line layer and the control layer is established after the failure using the first controller to propagate the connection states for use by other controllers of the control layer.

According to a further aspect of the present invention there is provided a controller configured for monitoring the resynchronization of network communication between a line layer and a control layer after identification of a network failure. The controller includes: the controller linkable to the control layer of the network, the control layer for monitoring network traffic communicated in the line layer. The controller also includes a controller interface for providing access to a resynchronization table, the resynchronization table for storing a plurality of connection states corresponding to a plurality of interconnected network elements, the interconnected network elements forming a network path in the line layer of the network, wherein resynchronization of the line layer and the control layer is established after the failure using the controller to propagate the connection states for use by other controllers of the control layer.

According to a still further aspect of the present invention there is provided resynchronization method for networks for re-establishing communication between a line layer and a control layer in the event of a failure. The method comprising the steps of defining a plurality of interconnections between network elements contained in the line layer to generate a network path; accumulating a plurality of connection states for the interconnected network elements of the network path; storing the connection states by populating a resynchronization table, the resynchronization table coupled to a first controller of the control layer; and providing the connection states of the resynchronization table to the controllers of the control layer in the event of the failure for resynchronization of the line layer and the control layer.

According to a further aspect of the present invention there is provided a computer program product for re-establishing communication between a line layer and a control layer in the event of a failure in networks. The product comprising a computer readable medium; a line layer module stored on the computer readable medium for defining a plurality of interconnections between network elements contained in the line layer to generate a network path; an accumulator module coupled to the line layer module for gathering the connection states for the interconnected network elements of the network path once defined; a resynchronization table module coupled to the accumulator module for storing the connection states for access by a first controller of the control layer; and a message module for providing the connection states of the resynchronization table to the controllers of the control layer in the event of the failure for resynchronizing the line layer and the control layer.

BRIEF DESCRIPTION OF THE DRAWINGS

These and other features of the preferred embodiments of the invention will become more apparent in the following detailed description in which reference is made to the appended drawings by way of example only wherein:

FIG. 5b shows further failure details of FIG. 5a.

DESCRIPTION OF THE PREFERRED EMBODIMENTS

Figure 1:
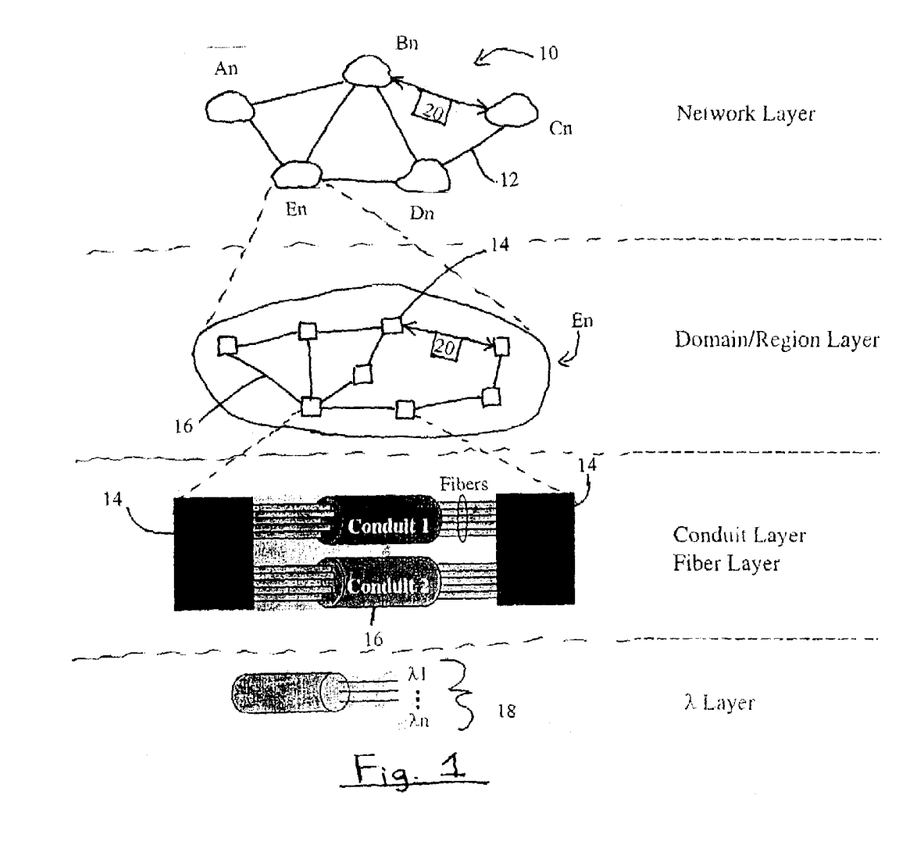
FIG. 1 is a diagram of a Global Network.

Referring to FIG. 1, a global telecommunication Network 10 contains a series of sub-networks An, Bn, Cn, Dn, En interconnected by bulk data transmission mediums 12. These mediums 12 can consist of such as but not limited to optical fiber, wireless, and copper lines which can be collectively referred to as the Backbone Network. Each sub-network An, Bn, Cn, Dn, En contains a plurality of network elements 14 interconnected by conduits 16, also referred to collectively as a control layer 15 and a line layer 17 (see FIG. 2). These conduits 16 can consist of fiber optic cables, DSL (Digital Subscriber Loop), cable, and wireless mediums, wherein each conduit 16 can be capable of providing the transmission of multiple wavelengths or signals 18 as required by the telecommunication network 10. The transmission structure of the telecommunication network 10 can be used by a variety of different carriers, such as ILECs, CLECs, ISPs, and other large enterprises to monitor and transmit a diverse mixture of data packets 20 in various formats. These formats can include voice, video, and data content transferred over the individual SONET, SDH, IP, WDN, ATM, and Ethernet networks associated with the telecommunication network 10.

Figure 2:
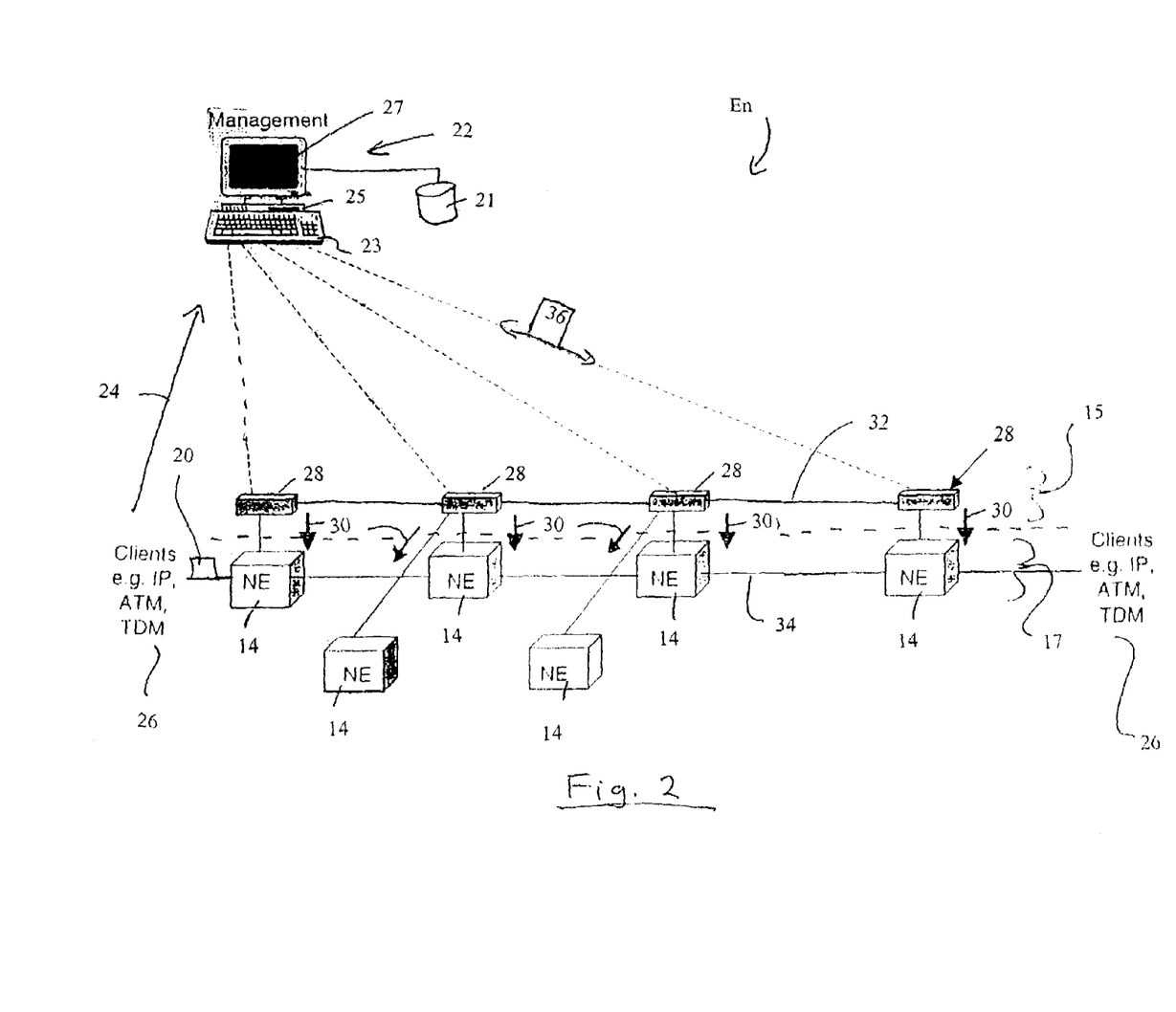
FIG. 2 is a diagram of a local network of FIG. 1.

Referring to FIG. 2, the subnetwork En includes each network element 14 interconnected by a series of conduits 16 referred to as a data path 34, which collectively comprise the line layer 17. The line layer 17 can be monitored by a central computerized management system 22, which for example co-ordinates a plurality of connection requirements 24 received from clients 26 connected to the sub-network En. The clients 26 or other peripheral devices can include such as but not limited to hubs, leased lines, IP, ATM, TDM, PBX, and Framed Relay PVC. Coupled to each network element 14 is a controller 28, which co-ordinates the connection and data requests 30 to each of their corresponding network elements 14. This association of controllers 28 is also referred to as the control layer 15, which has a complete picture of their corresponding network element 14 interconnections, as interconnected by a series of conduits 16 referred to as a control path 32. The control path 32 can receive data management and other network state information 36 from the management system 22.

The management system 22 can include a processor 25, which is coupled to a display 27 and to user input devices 23, such as a keyboard, a mouse, or other suitable devices. If the display 27 is touch sensitive, then the display 27 itself can be employed as the user input device 23. A computer readable storage medium 21 is coupled to the processor 25 for providing instructions to the processor 25 to instruct various controllers 28 and corresponding network elements 14 to perform steps or algorithms related to the operation of a protection switching mechanism 31 (see FIG. 3) implemented on the subnetwork En, in the event of a network failure as given below. The computer readable medium 21 can include hardware and/or software such as, by way of example only, magnetic disks, magnetic tape, optically readable medium such as CD ROMs, and semi-conductor memory such as PCMCIA cards. In each case, the computer readable medium 21 may take the form of a portable item such as a small disk, floppy diskette, cassette, or it may take the form of a relatively large or immobile item such as hard disk drive, solid state memory card, or RAM provided in the management system 22. It should be noted that the above listed example computer readable mediums 21 can be used either alone or in combination. Accordingly, the protection switching mechanism 31 can be implemented on the subnetwork En in regard to the co-ordination of the maintaining synchronization between the data paths 34 and the control paths 32, in the event of network failures, in the line layers 17 and control layers 15 respectively.

Figure 3:
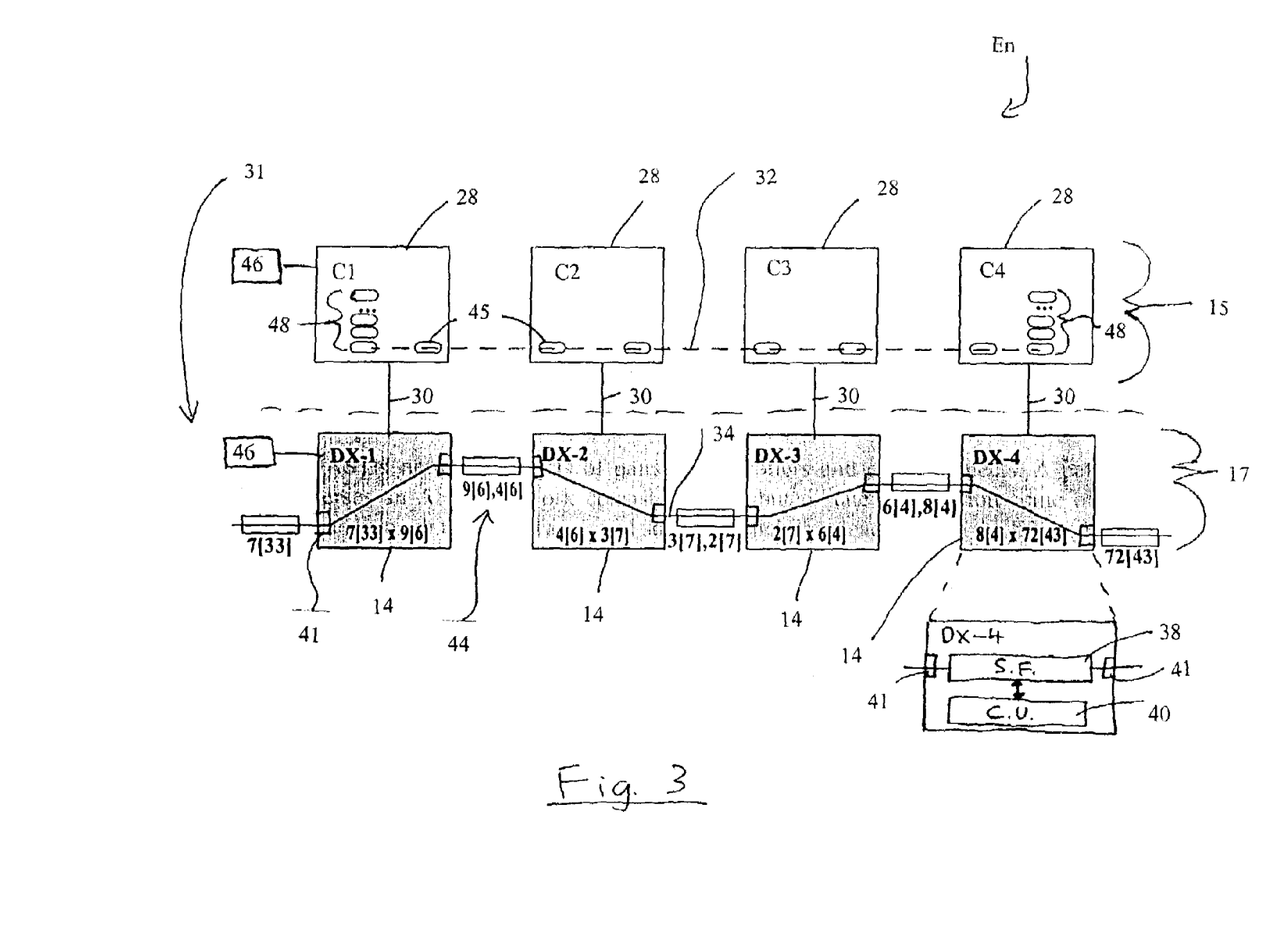
FIG. 3 shows a failure protection switching system of FIG. 2.

In reference to FIG. 3, a simplified version of the control layer 15 and the line layer 17 is given for clarity purposes only. The subnetwork En consists of four pairs of controllers 28 referred to individually as C-1, C-2, C-3, C-4 (collectively referred to as Cn) and network elements 14 referred to individually as cross connects DX-1, DX-2, DX-3, DX-4 (collectively referred to as DXn). The control layer 15 contains some of the general state information 36 (see FIG. 2) received from the management system 22 distributed amongst the controllers Cn. The controllers Cn have a subset of local state information 44 obtained from the general state information 36, and associated with the data path 34, as well as additional end to end information not present in the line layer 17. For example, C-1 and C-2 will have assigned logic channel numbers 45 to their shared control path 32, and will have created the control path 32 based on these logical channel numbers 45 for the purpose of end to end signaling. Further, additional state information from the general state information 36 is stored by C-1 and C-4 to represent the end points of the connections 32. These end points consist of a number of process objects 48 with their respective data, which can include from top to bottom, such as but not limited point information, call controller information, virtual circuit information, networking connection information, and application connection information.

The local state information 44 of the general state information 36 present in the line layer 17 can contain, for example see FIG. 3, an STS-1 signal arriving at DX-1 on logical port 7, time slot 33, depicted as 7[33]. Cross connect DX-1 connects the signal to logical port 9 time slot 6, depicted as 9[6]. The cross connect information 7[33]×9[6] represents the state that the cross connect DX-1 must remember to keep the connection alive. When the signal arrives on the cross connect DX-2, it arrives on logical port 4 time slot 6, depicted as 4[6]. Note that the logical port numbers can be different for the same fiber pair between adjacent cross connects DXns, for example 9[6] is the same as 4[6] between cross connects DX-1 and DX-2. The cross connects DXn of the line layer 17 also contain switch fabrics 38 and corresponding control units 40 for coordinating traffic data following from port 41 to port 41, as is known in the art. Accordingly, the switch fabric 38 of each cross connect DXn is connected to the corresponding plurality of ports 41. The switch fabric 38 also couples the ports 41 such that the data packets 20 (see FIG. 1) received on one of the ports 41 is output for another of the ports 41. The control unit 40 of the cross connects DXn is connected to the switch fabric 38 and monitors the adjacent conduits 16 of the data path 34 for failure detection.

The protection switching system 31 includes storage of selected portions of the local state information 44 in a network path state or resynchronization tables 46, which is coupled or otherwise interfaced to the head end controller C-1 of the control path 32. The interface can include a series of pointers to the local state information 44 stored in the resynchronization tables 46, or other hardware/software messaging elements providing access of the head end controller C-1 to the stored local state information 44. Accordingly, during the initial Set-up and Query messaging to construct the data path 34, such as the 7[33]-72[43] path of FIG. 3, the exact sequence of logical ports and time slots is queried and accumulated to generate the resynchronization table 46. As part of the normal set-up of the network data path 34, the local connection state information 44 is queried for all hops, and then the gathered local state information 44 can be carried back to populate the resynchronization table 46. This can be accomplished by modifying the network gather message used in telecommunication network 10, so that the message can gather the required information in the reverse flowing message direction as it returns back from cross connect DX-4 towards the head end cross connect DX-1, completing the data path 34 set-up. Accordingly, the resynchronization table 46 can be represented for example by CON/1={7[33],9[6],3[7],6[4],72[43]} for the data path 34 of FIG. 3. It is recognized that the above Set-up and Query algorithm may be selectively enabled on a per connection basis, as desired in configuration and maintenance of the telecommunication network 10.

Once the local state information 44 for the resynchronization table 46 arrives back at the head end cross connect DX-1, this resynchronization table 46 is then stored locally at the head end controller C-1, and can also be shadowed at a number of locations such as but not limited to the head end cross connect DX-1 as a back up in case the head end controller C-1 fails. This storage can be accomplished by journaling the contents of the resynchronization table 46 where it can be recovered by the head end controller C-1 after a failure, such as being stored on disk, non-volatile RAM, or its own data elements. It should be noted that the resynchronization table 46 stored on cross connect DX-1 can be independent of the cross connect information (i.e. 4[6]×3[7],2[7]×6[4], 8[4]×72[43]), however cross connect information could also be stored in the resynchronization table 46 as well if desired. However, it is recognized that deleting the cross connect information so that the resynchronization table 46 only contains the local state information 44 can help the resynchronization table 46 to be independent of the act of programming from the act of storing for greater network flexibility. Furthermore, it is recognized that the resynchronization table 46 is preferably accessible so as to be read/written/deleted in whole or in parts as required, as the network En dynamically changes in connection architecture.

Figure 4:
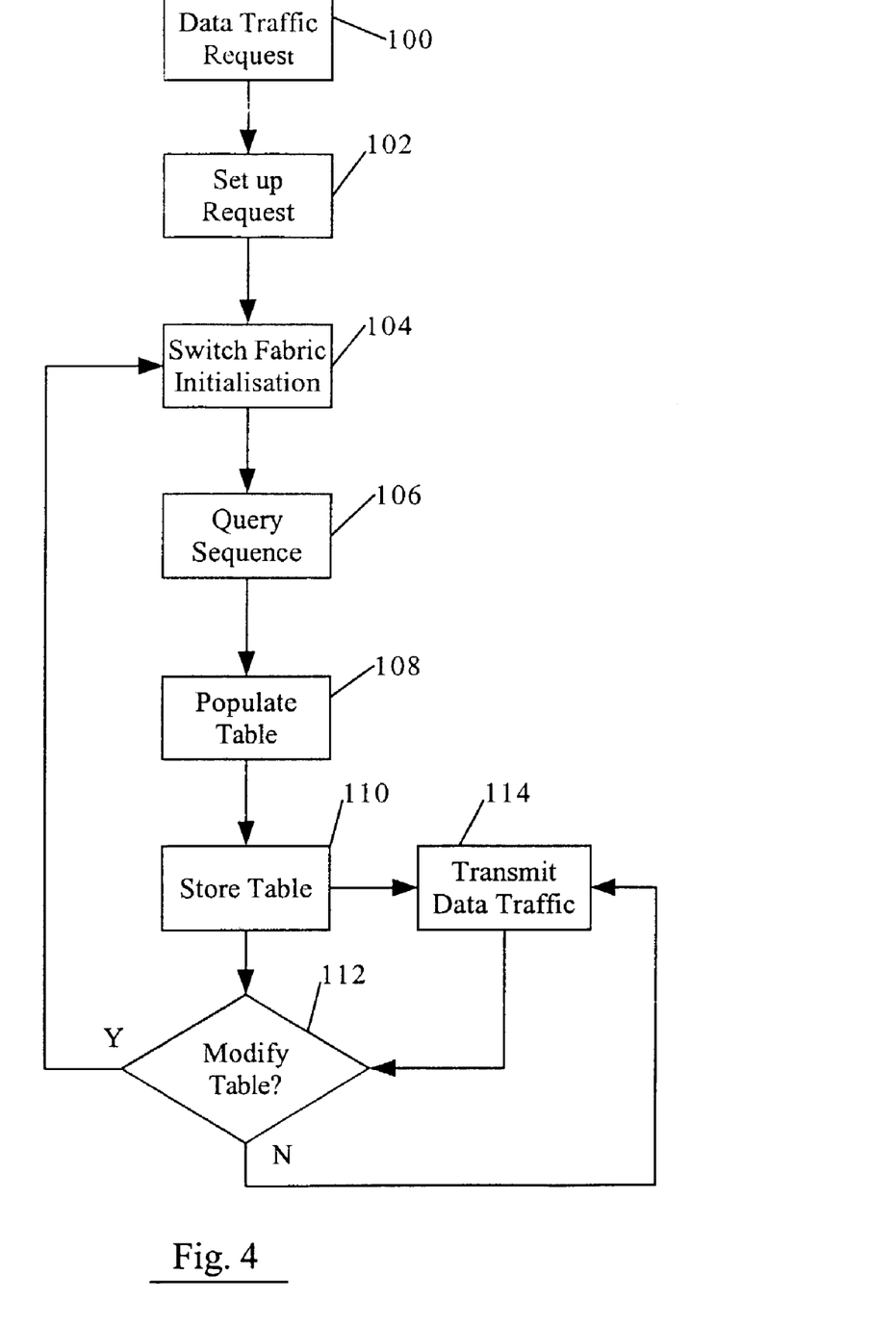
FIG. 4 is an operational flowchart of the system set-up of FIG. 3.

In regard to FIGS. 3 and 4 for operation of the protection switching system 31, the controllers 28 receive the connection and data traffic connection requirements 24 initiated by the client 26 at step 100. The head controller C-1 then notes the desired end to end connection request 7[33]-72[43] and sends the initial set-up message at step 102 along the selected control path 32, including associated tandem controllers C-2, C-3 and end controller C-4. Accordingly, the controllers Cn request 30 their respective cross connects DXn to configure the switch fabric 38 of each cross connect DXn at step 104, and the exact sequence of logical ports and time slots is queried 106 and sent as a reverse flowing message back to the head controller C-1. The local state information 44 is used to populate 108 the resynchronization tables 46 at step 110, which is then accessible by the head controller C-1. Preferably, a back-up copy of the resynchronization table 46 is shadowed at an auxiliary site, such as but not limited to the corresponding cross-connect DX-1. In subsequent operation of the subnetwork En, the local state information 44 of the resynchronization table 46 can be modified 112 in the event of dynamic connection state modification in the subnetwork En, such as but not limited to creation or removal of connections between ports 41 in the data channel 34. Otherwise, the requested data packets 20 are transmitted over the data channel 34 absent any network failures.

Traditionally, there are two types of failures that can be experienced in the subnetwork En, such as line failures and module failures. The basic subnetwork structure En consists of various links situated between corresponding transmitters and receivers of cross connects DXn, which can also be referred to as network elements 14. Accordingly, a line failure can include damage to the physical fiber 18 and optical components, such as the malfunction of amplification equipment situated along an optical data path 34. In contrast, the module failure can consist of inoperable transmission or reception equipment, such as a broken laser diode transmitter or controller module. It should be noted that both line failures and module failures may disable the logical and/or physical interconnection between two network elements 14. Preferably, the protection switching system 31 has the ability to distinguish between control path 32 and data path 34 failures, wherein control path 32 failures do not interrupt local state information 44 but leave the physical connections represented by the local state information 44 as ownerless.

Figure 5A:
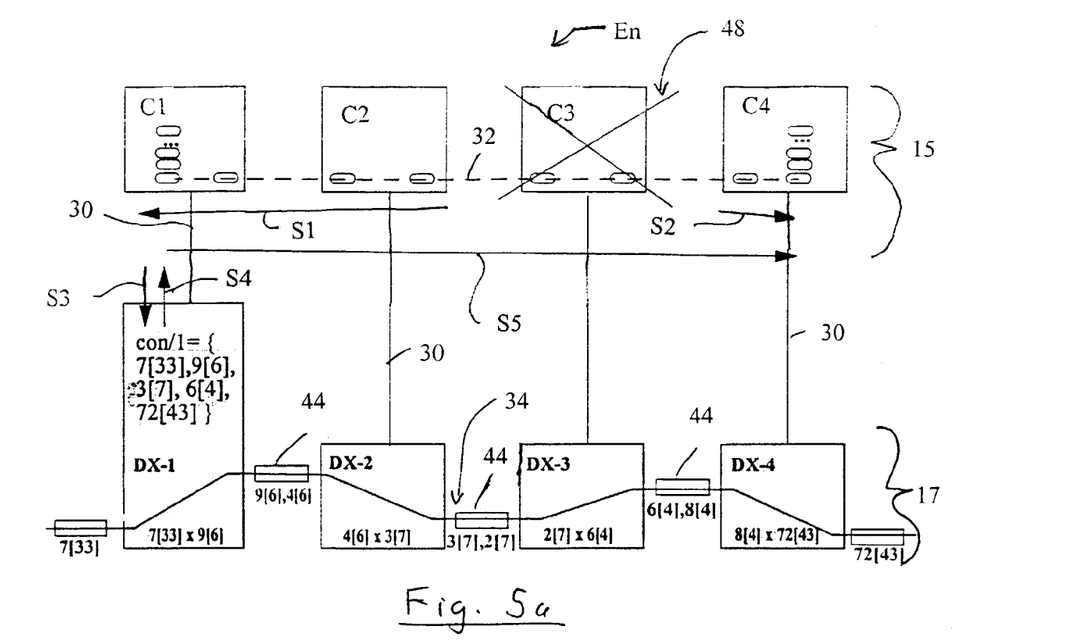
FIG. 5a shows a tandem controller failure for the network of FIG. 3.
Figure 5B:
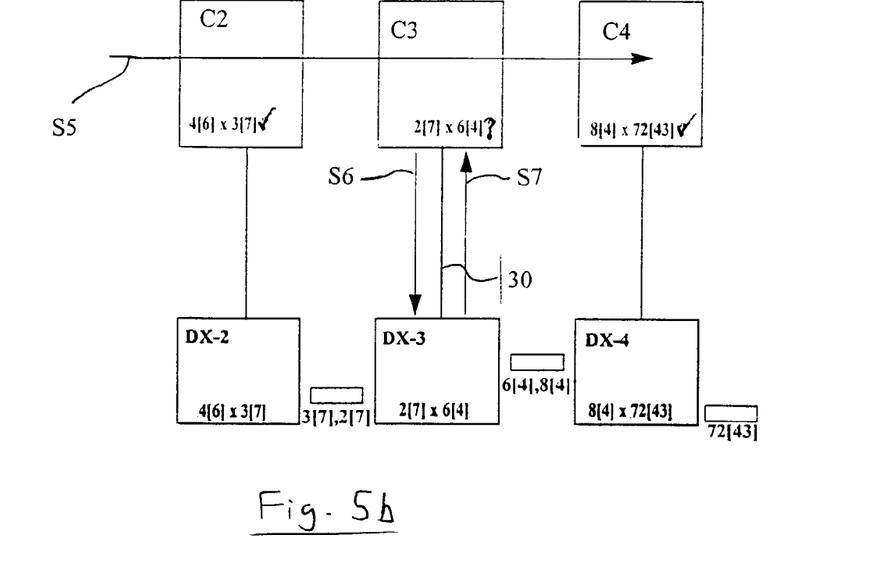

Referring to FIGS. 5a and 5b, a pure tandem failure 48 is shown, which could be caused for example by controller C-3 experiencing a short outage due to unplugging and plugging in new hardware. Referring to FIGS. 5a, 5b, control messages Sn are transmitted in the control layer 15 using data requests 30 and the control path 32 to implement the failure switching system 31. Firstly, control messages S-1 and S-2 note the failures of the signaling links between controllers C-2 and C-4 with downed controller C-3, with a reason denoted as "signaling failure". At each point along the way, the logical ports/time slots represented by the local state information 44 used by the path data 34 are marked as "disowned", as the actual control connection represented by the data path 34 is collapsed. Therefore, the ingress/head end controller C-1 receives the tear control message S-1 and notes the reason is due to the signaling failure. It should be noted that the controller C-4 does not receive the recreate control message S-5, as controller C-3 cannot propagate received control messages Sn. The local state information 44, through retrieval control message S-4, is communicated to the controller C-1 and placed in control message S-5, which is used to send the local state information 44 as path={7[33],9[6],3[7],6[4],72[43]} using the obtained sequence of logical ports and time slots from the resynchronization table 46 along the control path 32. As a result, controller C-1 queries the resynchronization table 46 through control message S-3 for the local state information 44 that represented failed data path 34. Accordingly, at some point controller C-3 will come back on-line and the set-up control message S-5 will propagate through to the end controller C-4, at which point the logical ports and time slots represented by the local state information 44 on C-1, C-2, C-3, and C-4 will be re-established and moved from the disowned to owned state. It is also recognized that the head end controller C-1, when it receives the tear control message S-1 due to the signaling failure, proceeds to query by control message S-3 the cross connect DX-1 for the local state information 44 contained in resynchronization table 46. However, the head end controller C-1 can also keep a shadow copy of the resynchronization table 46 to avoid the CCI overhead of such a query of control message S-3. It should be noted that another controller Cn or cross connect DXn can initiate the set-up control message S-5, if desired.

In regard to the operation of tandem controller C-3, under failure 48, reference is made to FIG. 5b. Accordingly, when tandem controller C-3 has restarted, it is not aware of all of the local state information 44 concerning the currently disowned state 2[7]×6[4]. As a result, after restarting, the tandem controller C-3 first queries and assigns the logical ports to the corresponding control path 32. Then, the tandem controller C-3 queries by control message S-6 the state connections that are currently resident on its corresponding cross connect DX-3, and then stores the local state information 44 represented by 2[7]×6[4] using the control message S-7. Subsequently, when the set-up control message S-5 reaches the re-started tandem controller C-3, tandem controller C-3 notes that it should now claim ownership of the disowned state of 2[7]×6[4], thereby re-establishing control of the complete data path 34. Preferably, in situations where re-started controllers Cn do not receive the set-up control message S-5 after re-starting, these controllers Cn completely release their disowned connection states contained in the local state information 44 in a predetermined number of minutes, such as but not limited to 10 minutes. This occurs also if the disowned state represented by the local state information 44 is not re-claimed by the explicit logical ports/time slot set-up according to the control message S-5. It is noted that the end controller C-4 also receives the control message S-5 when the tandem controller C-3 is restarted, and acts to reclaim the connection state of the local state information 44 resident on the cross connect DX-4.

In the event of the failure 48 occurring on the head controller C-1, one tear control message S-1 is propagated from the tandem controller C-2 to the end controller C-4, indicating the failure 48. Accordingly, the data control path 34 is collapsed and the connections represented by the local state information 44 are disowned for cross connects DX-2, DX-3, and DX-4. However, in the present case, the head end controller C-1 must then re-claim both its resynchronization table 46 of disowned local state information 44 and a local copy of the resynchronization table 46 prior to re-setting up its provisional connections according to the local state information 44. It is recognized that when the provisional connections are being set-up, a check is made to see if there is a current data base entry with a path for this connection in the local state information 44 recorded in the resynchronization table 46. Accordingly, if one exists then this is used. At this stage, the control messages S-3 and S-4 are used to generate the set-up path control message S-5 down the control path 32. In this case, the controller C-1 first takes ownership of its disowned connections and then controllers C-2, C-3, and C-4 reclaim their corresponding connections on cross connects DX-2, DX-3, and DX-4 respectively, using control messages S-6 and S-7. It is further recognized that the time-out protocol could also be used when the failure 48 occurs at the head controller C-1.

Figure 6:
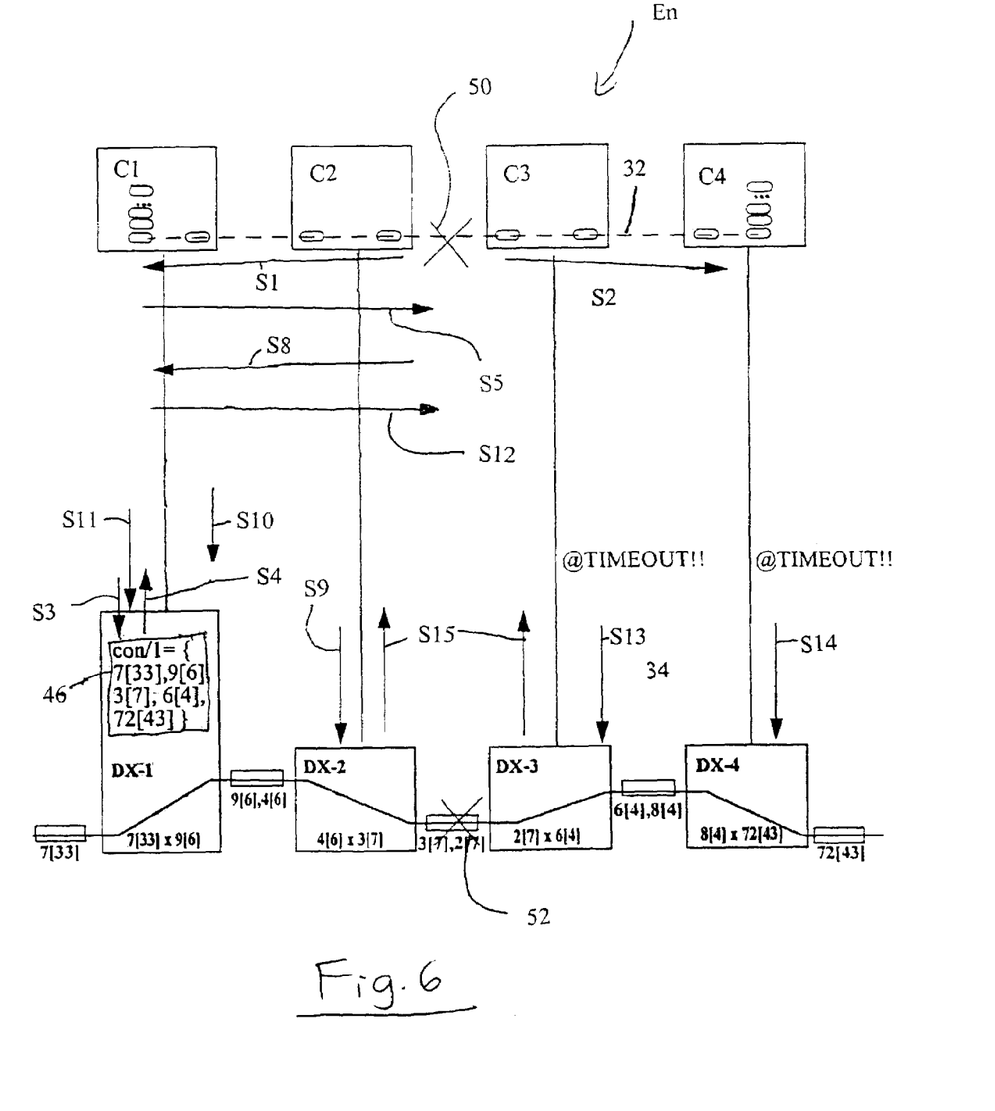
FIG. 6 shows a simultaneous control and data path failure for the network of FIG. 3.

Referring to FIG. 6, a simultaneous data path 34 and control path 32 failure is shown. Accordingly, the tandem controllers C-2 and C-3 initiate tear down control messages S-1 and S-2, thereby disowning the local state information 44 representing connections of data path 34. Correspondingly, control messages S-15 from the cross connects DX-2, DX-3 are also relayed to their corresponding tandem controllers C-2, C-3 for notification to the subnetwork En. Next, head controller C-1 retrieves the stored resynchronization table 46 using control messages S-3, S-4 for retrieving the port and time slot information, for use in generating the set-up path control message S-5, which contains for example the information (7[33],9[6],3[7],6[4],72[43]). However, controller C-2 after receiving the set-up control message S-5 sends a further tear control message S-8 telling the head controller C-1 that the control path 32 is broken at failure 50. Controller C-2 then proceeds to delete the local state information 44 from its corresponding cross connect DX-2 using control message S-9, and waits for further set-up path local state information 44 transmitted by the head controller C-1. Correspondingly, the head controller C-1 also deletes its local state information 44 using control message S-10 and further deletes the corresponding resynchronization table 46 containing the outdated exact series of port and time slot information for the failed control path 32, using control message S-11. Subsequently, the head controller C-1 obtains alternate local state information 44 from the resynchronization table 46 and propagates this along alternate control and data pathways 32, 34 for re-establishment of the required network connection using set-up re-dial path control message S-12. It should be noted in the event that failure 50 is not repaired, then controllers C-3 and C-4 continue to operate independently with disowned connections until a time out occurs after a predetermined period of time, upon which controllers C-3 and C-4 send respective control messages S-13 and S-14 to delete their disowned local state information 44 resident at cross connects DX-3, DX-4 respectively.

Figure 7:
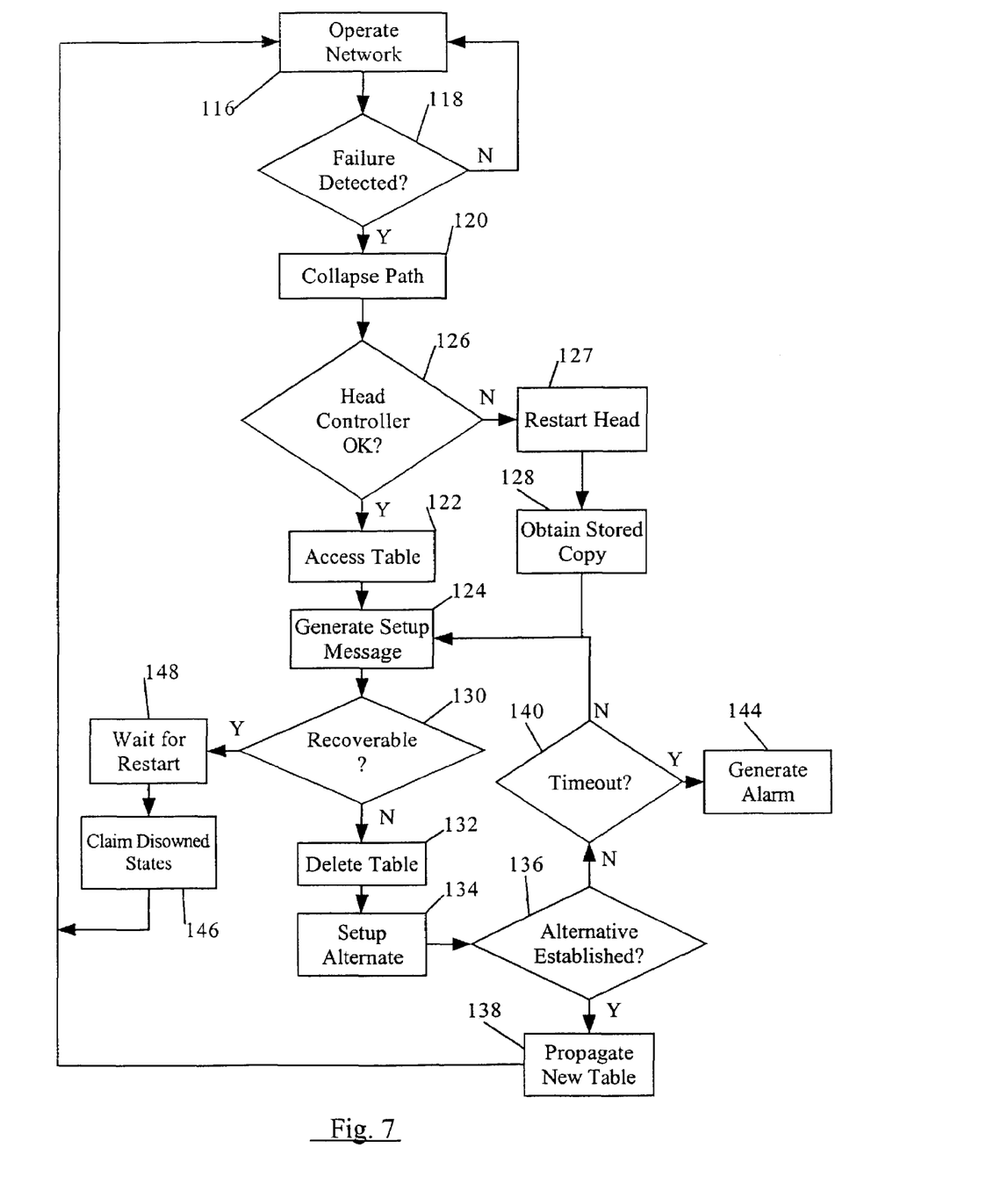
FIG. 7 is an operational flowchart of the failure mode for the network of FIG. 6.

Referring to FIGS. 6 and 7, operation of the failure mode of the protection switching system 31 and associated subnetwork En follows below. After the resynchronization table 46 has been set-up, the subnetwork En continues to operate 116 until the failure 48, 50, 52 is detected at step 118. The functioning controllers Cn receive the failure control messages S-1, S-2 and the corresponding data path 32 is collapsed, thereby disowning the connection resident in the cross connects DXn. The head controller C-1, or replacement if needed, then accesses the resynchronization table 46 information at step 122 and generates 124 the set-up path signal S-5 along the control path 32, which is propagated to the end controller C-4 once all the controllers Cn are restarted. In the event that head controller C-1 is not available 126, the head controller is restarted at 127 and a stored copy of the resynchronization table 46 is retrieved 128 prior to generation of the control message S-5. In the event the failure is recoverable at step 130, then the controllers Cn wait to be restarted 148 before resynchronizing with their corresponding cross connects DXn, by reclaiming disowned states 146 as identified by the set-up control message S-5. Accordingly, the subnetwork En is re-synchronized and returns to normal operation mode 116.

However, in the event of an unrecoverable control/data failure 50, 52 being detected at step 130, the resynchronization table 46 data is deleted at step 132 and the controller C-1 tries to set-up 134 an alternate data path 34 with control message S-12. In the event an alternate data path 34 is established 136, the new set-up resynchronization table 46 is populated (as described in FIG. 4) at step 138 and the subnetwork En is operated as directed by client requests 24 and the data packets 20. However, if the alternate data path 34 can not be established at time-out step 140, either retries are attempted for control message S-5 at step 124 or an alarm time-out 144 is transmitted for resolution by the management system 22.

The switching protection system 31 of the present invention provides a system and process for using mechanisms for creating and removing network connections represented as local state information 44 in the resynchronization table 46 to re-create connection states after the failure 48, 50, 52 has occurred. This switching protection system 31 can store the resynchronization table 46 of the entire data path 34 of the subnetwork En of interconnected network elements 14 at the head end controller C-1 of the subnetwork En. After the control element failure has occurred, signaling control messages Sn are used to populate the local state information 44 from the controller C-1 and are used to re-set-up the failed data path 34 and carry the corresponding local state information 44 back to all of the control elements Cn along this data path 34. Furthermore, when there is the failure in the control path 32, but the data path 34 continues to operate, the head end controller C-1 receives an indication that there has been the control path failure 48, 50 as distinguished from the data path failure 52. Accordingly, after the failure, each of the controllers Cn query the exact states of all of their connections in their corresponding cross connects DXn and attempt to re-create them, using the actual path of their stored data path states is the resynchronization table 46. The present protection switching system 31 can be used in the event of multiple controller Cn failures, which are subsequently re-booted. In this case, the subnetwork En will continue to carry the data packets 20 and when the controllers Cn are re-started, the controllers Cn re-learn all of the local state information 44 through the set-up control message S-5 populated by the accumulated local state information 44 contained in the resynchronization table 46. This set-up control message S-5 provides the associated controllers Cn with the local state information 44 used to continue managing the data paths 34 that are already operating on their respective cross connects DXn, and to be able to manage new connections as required. The protection switching system 31 also provides for re-booting in the event of failures in the line layer 17 that occurred while portions of the control layer 15 were down. Accordingly, resynchronization in this double failure environment is facilitated through the use of the control message S-5 populated by the local state information 44 stored in the resynchronization table 46, which is coupled to the head controller C-1.

In addition, the protection switching system 31 can also manage planned outages of the controllers Cn, or associated signaling cards for the purposes of software upgrade or major configuration changes. Accordingly, the control layer failure 48 can be attributed by either an operational failure or a failure for upgrade reasons. It is recognized that the local state information 44 can also be stored in parts as multiple distributed resynchronization tables 46. Accordingly, the head controller C-1 can access these multiple locations of the resynchronization table 46, thereby obtaining a complete picture of the distributed network of local state information 44 of the data path 34. It should also be noted that the resynchronization table 46 can be a logical and/or physical entity.

In the switching protection system 31, the protection protocol given in FIGS. 4 and 7 is followed to help facilitate the resynchronization of the subnetwork En after the failure has occurred. This protection protocol contains the control messages Sn of the ability to query and store the exact sequence of logical ports and time slots that make up the data path 34, as the resynchronization table 46. The head/ingress end C-1 of the control path 32 can receive the stored local state information 44 during set-up and can store it in both local and in shadow locations. The switching protection system 31 also contains the ability to distinguish between control path 32 and data path 34 failures, as control path 32 failures to do not clear cross connect data represented by the local state information 44, but simply leave it "ownerless". The switching protection system 31 also contains the ability to populate the exact sequence of logical ports and time slots accumulated in the definition of the subnetwork En implemented, as the set-up control message S-5 initiated by the head controller C-1 to re-claim "ownerless" cross connections contained on respective cross connects DXn. The switching protection system 31 also facilitates the clearing of an "ownerless" local state information 44 after a pre-determined period of time has lapsed.

It should be noted for the purposes of implementation of the protection switching system 31 of the present invention, a network element 14 can be any of the following kinds of devices, such as but not limited to: a SONET cross connect or add/drop multiplexer (i.e. a device that can take input port/fiber/time slot and map to output/port/fiber/time slot). The network element 14 can also include a time division multiplexer using mechanisms other than SONET to multiplex data in time that is able to take input port/fiber/time to output port/fiber/time, as well as a Lambda switch or pure photonic switch that can take port/fiber/wavelength input and map it to output port/fiber/time slot. Furthermore, it is recognized that the protection switching system 31 can also use any switch capable of moving photons in or out either with or without amplification or wavelength conversion, and can select input port to output port mapping doing a wavelength conversion along the way (i.e. MEMS switches, Bubble switches, or variations based on wavelength filtering techniques). Further, the protection system 31 can also employ switches that operate statistically by the insertion of a header to allow multiplexing and de-multiplexing of the data packets 20. Such switches 14 can take input port/header and map to output port/header (i.e. ATM, MPLS, and frame relay).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A network protection switching system for resynchronizing network communication between a line layer and a control layer after identification of a network failure, the system comprising:
   a) a resynchronization table for storing a plurality of connection states corresponding to a plurality of interconnected network elements, the interconnected network elements forming a network path in the line layer of the network; and
   b) an interface for providing access of a first controller to the connection states of the resynchronization table, the first controller included in the control layer which is coupled to the line layer for monitoring network traffic communicated therein;
   wherein resynchronization of the line layer and the control layer is established after the failure using the first controller to propagate the connection states for use by other controllers of the control layer.

2. The system according to claim 1 further including a protocol for accessing and utilizing the resynchronization table.

3. The system according to claim 2, wherein the protocol has a message able to accumulate the connection states of the network path and populate the resynchronization table with the accumulated connection states.

4. The system according to claim 3, wherein the connection states are selected from the group comprising: a port number, a time slot number, a fiber number, a wavelength number, a header, and cross connection information.

5. The system according to claim 3, wherein the protocol has a retrieval message for the first controller to obtain the data of the resynchronization table from the stored location.

6. The system according to claim 5, wherein the protocol has a set-up message populated by the retrieval message, the set-up message for propagation in the control layer for re-claiming disowned connection data caused by the failure.

7. The system according to claim 6, wherein the protocol has a time-out message for deleting disowned connections if the corresponding controller does not receive the set-up message within a pre-determined time period.

8. The system according to claim 6, wherein the first controller is an ingress controller of the network path.

9. The system according to claim 3, wherein the retrieved message is directed to a link containing the storage location of the resynchronization table.

10. The system according to claim 9, wherein the resynchronization table is stored at the location selected from the group comprising: remote and local.

11. The system according to claim 2, wherein the protection switching system can distinguish between a control layer and a line layer failure.

12. The system according to claim 6, wherein the protection switching system can distinguish between a controller layer and a line layer failure.

13. The system according to claim 2, wherein the protocol has a up-date message for modifying the connection states of the resynchronization table once initially stored.

14. The system according to claim 2, wherein one of the network elements is selected from the group comprising: a SONET cross connect, an add drop multiplexer, a time division multiplexer, a Lambda switch, a Photonic switch, a MEMS switch, a Bubble switch, a Wavelength filtering switch, an ATM switch, an MPLS switch, and a frame relay switch.

15. The system according to claim 14, wherein the first controller is an ingress controller.

16. The system according to claim 15, wherein the ingress controller maintains a updated version of the resynchronization table.

17. A resynchronization method for networks for re-establishing communication between a line layer and a control layer in the event of a failure, the method comprising the steps of:
   a) defining a plurality of interconnections between network elements contained in the line layer to generate a network path;
   b) accumulating a plurality of connection states for the interconnected network elements of the network path;
   c) storing the connection states by populating a resynchronization table, the resynchronization table coupled to a first controller of the control layer; and
   d) providing the connection states of the resynchronization table to the controllers of the control layer in the event of the failure for resynchronization of the line layer and the control layer.

18. The method according to claim 17 further comprising the step of storing the resynchronization table at a location selected from the group comprising: remote and local.

19. The method according to claim 18 further comprising the step of accumulating the cross connection states once the network path has been defined for receiving by the first controller.

20. The method according to claim 19, wherein the connection states are selected from the group comprising: a port number, a time slot number, a fiber number, a wavelength number, a header, and cross connection information.

21. The method according to claim 19 further comprising the step of retrieving the connection state data from the resynchronization table by the first controller in the event of the failure.

22. The method according to claim 18, wherein the step of providing the connection states to the control layer results in re-claiming of disowned connection data.

23. The method according to claim 22 further comprising the step of deleting a disowned connection in response to the corresponding controller not receiving the connection state data of the resynchronization table within a predetermined time.

24. The method according to claim 22, wherein retrieval of the connection states is obtained through a link to the resynchronization table.

25. The method according to claim 24, wherein the link is stored at a location selected from the group comprising: remote and local.

26. The method according to claim 18 further comprising the step of distinguishing between the control layer and the line layer failure.

27. The method according to claim 23 further comprising the step of distinguishing between the control layer and the line layer failure.

28. The method according to claim 18 further comprising the step of updating the connection states of the resynchronization table once initially stored.

29. A computer program product for re-establishing communication between a line layer and a control layer in the event of a failure in networks, the product comprising:
   a) a computer readable medium;
   b) a line layer module stored on the computer readable medium for defining a plurality of interconnections between network elements contained in the line layer to generate a network path;
   c) an accumulator module coupled to the line layer module for gathering the connection states for the interconnected network elements of the network path once defined;
   d) a resynchronization table module coupled to the accumulator module for storing the connection states for access by a first controller of the control layer; and
   e) a message module for providing the connection states of the resynchronization table to the controllers of the control layer in the event of the failure for resynchronizing the line layer and the control layer.

30. A controller configured for monitoring the resynchronization of network communication between a line layer and a control layer after identification of a network failure, the controller including:
   a) the controller linkable to the control layer of the network, the control layer for monitoring network traffic communicated in the line layer; and
   b) a controller interface for providing access to a resynchronization table, the resynchronization table for storing a plurality of connection states corresponding to a plurality of interconnected network elements, the interconnected network elements forming a network path in the line layer of the network;

wherein resynchronization of the line layer and the control layer is established after the failure using the controller to propagate the connection states for use by other controllers of the control layer.

* * * * *